(12) United States Patent
Imiolczyk et al.

(10) Patent No.: US 11,892,088 B2
(45) Date of Patent: Feb. 6, 2024

(54) SPACE-SAVING MULTI-VALVE AND METHOD OF OPERATING A MULTI-VALVE

(71) Applicant: Dr. Ing. h.c. F. Porsche Aktiengesellschaft, Stuttgart (DE)

(72) Inventors: Marius Imiolczyk, Tamm (DE); Harald Raiser, Balingen (DE); Andreas Fritz, Oetisheim (DE); Alexander Seibel, Fellbach (DE); Moritz Dickhoff, Leonberg (DE); Stephan Machate, Hainfeld (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/952,353

(22) Filed: Sep. 26, 2022

(65) Prior Publication Data

US 2023/0104346 A1    Apr. 6, 2023

(30) Foreign Application Priority Data

Sep. 29, 2021   (DE) ...................... 10 2021 125 250.4

(51) Int. Cl.
*F16K 11/20* (2006.01)
*F16K 11/065* (2006.01)
(Continued)

(52) U.S. Cl.
CPC ............... *F16K 11/20* (2013.01); *F16K 3/32* (2013.01); *F16K 3/34* (2013.01); *F16K 11/0655* (2013.01);
(Continued)

(58) Field of Classification Search
CPC ........ F16K 11/0655; F16K 3/312; F16K 3/32; F16K 3/34; F16K 2200/203
See application file for complete search history.

(56) References Cited

U.S. PATENT DOCUMENTS

| 3,773,077 A | 11/1973 | Barnebey |
| 2008/0173836 A1* | 7/2008 | Chern ...................... F16K 3/34 251/282 |

(Continued)

FOREIGN PATENT DOCUMENTS

| CN | 108757966 A * 11/2018 |
| DE | 2118710 A1   11/1972 |

(Continued)

*Primary Examiner* — Atif H Chaudry
(74) *Attorney, Agent, or Firm* — LEYDIG, VOIT & MAYER, LTD.

(57) ABSTRACT

A multi-valve for distributing at least one fluid, includes a plurality of input channels for supplying a respective fluid, a plurality of output channels for discharging the fluid, wherein a respective input channel can be connected via a plurality of input branches to a respective, substantially coaxially arranged output branch of the respective different output channels, and a switch plate which is arranged in a gap between the input branches and output branches and can be translationally moved transversely to the input branches and output branches in order to open and/or close a connection of the respective input branch to the respectively assigned output branch, wherein the switch plate is connected to an endless belt.

14 Claims, 3 Drawing Sheets

(51) Int. Cl.
    *F16K 3/32*           (2006.01)
    *F16K 3/34*           (2006.01)
    *F16K 3/312*         (2006.01)

(52) U.S. Cl.
    CPC ........ *F16K 3/312* (2013.01); *F16K 2200/203* (2021.08)

(56) References Cited

U.S. PATENT DOCUMENTS

| | | | | |
|---|---|---|---|---|
| 2013/0306896 A1* | 11/2013 | Nagai | ................. | F16K 3/18 251/193 |
| 2015/0159665 A1* | 6/2015 | Fletcher | ................. | F02B 37/16 415/58.4 |

FOREIGN PATENT DOCUMENTS

| | | | |
|---|---|---|---|
| DE | 102007009194 B3 | 9/2008 | |
| DE | 102019216581 A1 | 4/2021 | |
| GB | 2324600 A | 10/1998 | |

* cited by examiner

SPACE-SAVING MULTI-VALVE AND METHOD OF OPERATING A MULTI-VALVE

CROSS REFERENCE TO RELATED APPLICATIONS

This application claims benefit to German Patent Application No. DE 10 2021 125 250.4, filed on Sep. 29, 2021, which is hereby incorporated by reference herein.

FIELD

The invention relates to a multi-valve and a method for operating a multi-valve, with the aid of which different fluids can be distributed individually to different consumers in a space-saving manner.

BACKGROUND

From DE 21 18 710 A1 it is known to open or close different coaxially extending channels of a valve by rotating a perforated disk.

From DE 10 2007 009 194 B3 it is known to connect or close radially inwards opened, axially extending channels in a tube wall to an inner tube volume via a rotatable cylinder having through-openings.

There is a constant need to be able to distribute different fluids in a space-saving manner.

SUMMARY

In an embodiment, the present disclosure provides a multi-valve for distributing at least one fluid, comprising a plurality of input channels for supplying a respective fluid, a plurality of output channels for discharging the fluid, wherein a respective input channel can be connected via a plurality of input branches to a respective, substantially coaxially arranged output branch of the respective different output channels, and a switch plate which is arranged in a gap between the input branches and output branches and can be translationally moved transversely to the input branches and output branches in order to open and/or close a connection of the respective input branch to the respectively assigned output branch, wherein the switch plate is connected to an endless belt.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
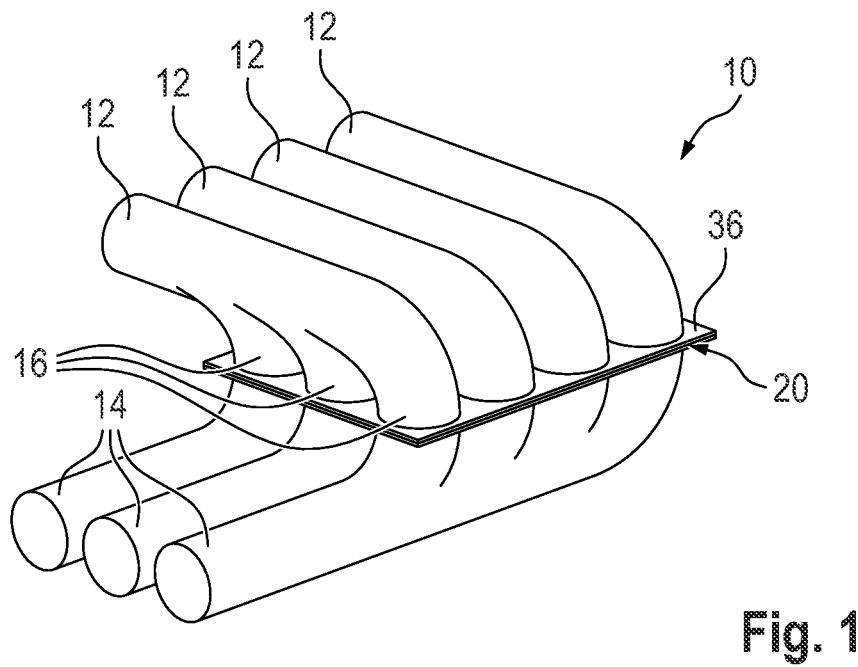
FIG. 1 shows a schematic simplified perspective view of a portion of a multi-valve.

In an embodiment, the present invention provides measures that enable a space-saving distribution of fluids.

In the following disclosure, if one feature is shown in combination with another feature, this is only for the purpose of simplifying the presentation of the invention and is not intended to mean that this feature cannot also be a development of the invention without the other feature.

An embodiment relates to a multi-valve for distributing at least one fluid, having a plurality of input channels for supplying a respective fluid and a plurality of output channels for discharging the fluid, wherein the respective input channel can be connected via a plurality of input branches to a respective, substantially coaxially arranged output branch of the respective different output channels, and a switch plate which is arranged in a gap between the input branches and output branches and can be translationally moved transversely to the input branches and output branches in order to open and/or close a connection of the respective input branch to the respective assigned output branch, wherein the switch plate is connected to an endless belt.

For example, the multi-valve can be used as a mixing tap for mixing liquids, in particular water, by supplying liquids having differently high temperatures via the respective input channel and by admixing or not mixing the different liquids in the gap in the respective output channel depending on the switch position of the switch plate, in order to set a specific temperature in the discharged liquid in the respective output channel. In particular, the multi-valve can be used in a climate control device of a motor vehicle, with the aid of which, for example, cabin climate, influenced by an air-conditioning system, in the interior of the motor vehicle can be temperature-controlled and/or a motor vehicle battery can be temperature-controlled.

At least one input branch can branch off the at least one input channel while at least one output branch branches off the at least one output channel, wherein at least two input channels and/or at least two output channels are provided. The multi-valve may in particular be configured to selectively connect a plurality of input channels to a plurality of output channels. Preferably, the number of input branches branching off the respective input channel corresponds to the number of output channels and/or the number of output branches branching off the respective output channel corresponds to the number of output channels. In principle, this makes it possible to connect all input channels to all output channels. If a defined connection of a specific input channel to a specific output channel is to be ruled out, it is possible to safely avoid this connection by omitting or plugging the input branch and/or output branch otherwise provided for this connection. In a preferred embodiment, it is however provided that all input channels can be connected to all output channels, wherein a connection to be permanently closed in all operating situations can be achieved exclusively by the design of the switch plate and of the switch positions provided for the switch plate. It is thereby possible for different application situations to only exchange the switch plate and/or to change the switch positions of the switch plate that can be actuated by a control device and to leave the remaining multi-valve unchanged. As a result, a particularly large number of common parts can be used for different application situations to be represented by the multi-valve.

A single-phase or multi-phase fluid, in particular a liquid, a gas, an emulsion, or a suspension, that flows in via a considered input channel, may be distributed to the different input branches that branch off the considered input channel and respectively communicate with the considered input channel. The respective input branches can transition via the gap into the respective substantially coaxially arranged assigned output branches, wherein the respective assigned output branch communicates with respectively different output channels. As a result, the fluid coming in from the considered input channel may be distributed to different output channels. Accordingly, from a considered output channel, the associated output branches, which respectively communicate with the considered output channel, may branch off. The respective output branches can transition via the gap into the respective, substantially coaxially arranged assigned input branches, wherein the respective assigned input branches communicate with respectively different input channels. This allows the fluid coming in from each of the different input channels to be merged into the considered output channel. In addition, depending on the switch position and configuration of the switch plate, it is possible to connect exactly one input channel to exactly another output channel and/or to not connect a specific input channel and/or a specific output channel at all.

The switch plate, which is provided, in particular in a fluid-tight manner, in the gap between the input branches and output branches, can have through-openings in order to establish a connection between the respective input branch and the output branch. If a connection between the respective input branch and the output branch is to be closed, the switch plate in the considered switch position is designed to be continuous in this region, i.e., without a through-opening. Via the distribution of the through-openings and the continuous regions in the switch plate, specific connections between the respective pairs of input branch and output branch can be opened and closed in a specific switch position of the switch plate. In order to adjust a further switch position of the multi-valve, it is sufficient to displace the switch plate through a translational, i.e., linear, movement within the gap so that the switch plate performs a translational movement, relative to the alignment of the input branches and output branches at the gap, within a radial plane, lying in the gap, of the input branches and output branches. The switch plate can be configured as a perforated plate, which, similarly to a perforated tape, opens or closes connections assigned to a specific switch position in a transverse direction depending on the position. Due to the linear movement of the switch plate in the transverse direction, it is possible to use substantially the entire surface of the switch plate for opening and closing connections between the respective input branches and output branches in the gap. In comparison to a rotating switch disk, an unused radially inner partial surface is avoided.

The switch plate is in particular produced from a metallic material. In addition, the switch plate may have as low a thickness as possible in the flow direction of the input branches and output branches in the gap. The switch plate is thus sufficiently flexible so that the end sides of the switch plate facing in the translational direction can be connected to one another in order to thereby connect the switch plate to an endless belt. As a result, the switch plate can be annularly closed in the movement direction, in particular similarly to a conveyor belt. If a specific switch position for the switch plate is to be actuated, it is possible for this purpose to move the switch plate configured as an endless belt in the one transverse or in the opposite transverse direction through the gap. This makes it possible to actuate a different switch position particularly quickly from the one switch position by using the shortest and fastest movement direction for the switch plate for reaching the new switch position. As a result, the multi-valve can realize a particularly short switching time.

The configuration of the switch plate as an endless belt makes use of finding that the sufficiently deformable switch plate can be moved past the input channels or output channels in a space-saving manner and deflected. The very thin switch plate can be moved as closely as possible past the input channels or output channels so that the installation space barely increases. At the same time, it is not necessary to provide storage space for accommodating the switch plate at the transverse ends of the gap in the movement direction of the switch plate, as would be the case with a purely planar switch plate in the form of a slider in which the slider would project particularly greatly in its end positions. Instead, the switch plate, which is designed as an endless belt, can be compactly integrated into the geometry of the multi-valve in a space-saving manner. By the translational movement of the switch plate configured as an endless belt in the transverse direction within the gap, the switch plate can be guided past the input channels or output channels in a space-saving manner so that a space-saving distribution of fluids is enabled with the aid of the multi-valve.

In particular, the input branches and the output branches are regularly arranged in rows and columns at the gap. The input branches and the output branches may be arranged in a grid-like manner. In the row direction and/or in the column direction, successive input branches and output branches may be provided substantially equidistantly. As a result, the through-openings and continuous regions of the switch plate for opening or closing a connection between adjacent input branches and output branches at the gap are likewise arranged regularly in rows and columns, preferably equidistantly. This enables a row of through-openings and continuous regions that extend transversely to the movement direction of the switch plate to be reused in different switch positions of the switch plate. By means of a suitably selected sequence of switch positions along the movement direction of the switch plate, many usable switch positions can be actuated with a comparatively short length of the switch plate in the movement direction. With a low installation space requirement, the multi-valve can realize many different switch positions.

Preferably, the input channels or the output channels extend out of the end face of a volume limited by the switch plate, wherein all input branches or all output branches are in particular provided within the volume. The volume limited within the switch plate configured as an endless belt can thereby be utilized almost entirely, resulting in a space-saving and compact construction. The switch plate configured as an endless belt can be formed similarly to a conveyor belt in which a long side is guided through the gap between the input branches and the output branches. Either the input channels can extend into this volume at an end face and be deflected substantially by 90° via the input branches, or the output channels extend into an end face of the volume limited by the switch plate configured as a continuous belt and are deflected substantially by 90° via the output branches. As a result, the switch plate can easily and space-savingly be guided around the input channels or the output channels and preferably be combined with them in a common sub-assembly.

Particularly preferably, the switch plate is guided in and/or out of the gap between the input branches and the output branches with the aid of at least one driven and/or moving deflection roller. The deflection roller may be positively and/or frictionally coupled to the shift plate. The driven deflection roller can be rotated with the aid of a drive means, in particular a stepper motor, in order to move the switch plate through the gap. Preferably, the switch plate has markings, with the aid of which a specific relative position of the switch plate and the reaching of a specific switch position can be identified. The drive means can in particular be actuated by a control device in order to be able to reach a desired switch position of the switch plate. In particular, the switch plate is deflected at both transverse ends of the gap on at least one deflection roller each, wherein the switch plate is pretensioned between two deflection rollers spaced apart via the gap. This avoids ripples of the switch plate in the gap, which could lead to leaks and leakage.

In particular, a diameter of the deflection roller corresponds to at least the sum of the extensions of the respective input channel and of the associated input branches or the sum of the extensions of the respective output channel and of the associated output branches along the flow direction in the gap between the input branches and output branches, wherein the diameter of the deflection roller is in particular at most 10% greater. With only exactly two deflection rollers, it is thus possible to guide the switch plate configured as an endless belt around the input channels or around the output channels. The installation space requirement in the flow direction of the input branches and the output branches in the gap is thus kept low. Moreover, a comparatively large radius of curvature is achieved for the switch plate along the deflection roller, which radius can prevent both the risk of plastic deformations at a radius of curvature that is too small and component loads on the switch plate. If a sufficiently large radius of curvature can be ensured for the switch plate, it is alternatively also possible to respectively provide two deflection rollers for the switch plate on both sides of the gap, for example, which can reduce the installation space requirement of the deflection rollers in the transverse direction.

Preferably, the input channels and the output channels are aligned substantially perpendicularly to one another, wherein a deflection roller arranged above or below the output channels is positioned at a greater distance from the input channels than another deflection roller is or a deflection roller arranged above or below the input channels is positioned at a greater distance from the output channels than another deflection roller is. If a particularly large number of switch positions and/or a particularly large number of rows with through-openings and/or continuous regions are provided for the switch plate, it may happen that the switch plate configured as an endless belt has a length that is greater than would result when guiding it as closely as possible past the input channels or output channels. In this case, the deflection roller that is already arranged adjacently to the channels not enclosed by the switch plate can be at a greater distance from the enclosed channels so that laterally projecting is avoided or only provided in the direction of the non-enclosed channels that already project. The installation space requirement can thereby be kept low and a compact installation space design can be maintained.

Particularly preferably, the switch plate has through-openings for overflowing from the input branch into the output branch, wherein different connections of input branches to assigned output branches are opened and/or closed depending on the relative position of the switch plate. The same through-opening can thereby be used in different switch positions of the switch plate for respectively different connections between the respective different input branch and the associated output branch. A short switch plate, which requires little installation space, can thus realize many different switch positions.

In particular, a sealing mat for sealing the gap is provided between the switch plate and the input branches and/or between the switch plate and the output branches. The sealing mat can in particular be pressed onto the switch plate with the aid of interconnected housing halves of the multi-valve. Sufficient tightness can thereby be achieved between the input branches spaced apart from one another via the gap and the switch plate with the respectively assigned output branches, wherein the switch plate is at the same time not immovably jammed on the sealing mat but can still be displaced linearly along the sealing mat in a transverse direction. Preferably, the sealing mat is somewhat compressed by the switch plate so that the sealing mat can expand somewhat into the through-opening of the switch plate. As a result, sealing mats provided on both sides of the switch plate may contact one another at the inner edge of the through-opening and improve the sealing effect with respect to the switch plate against the fluid conveyed through the through-opening.

Preferably, a control device is provided for moving the switch plate to predefined switch positions, wherein at least two switch positions utilize the same sub-region of the switch plate. The same through-opening can thereby be used in different switch positions of the switch plate for respectively different connections between the respective different input branch and the associated output branch. A short switch plate, which requires little installation space, can thus realize many different switch positions.

An embodiment relates to a method of operating a multi-valve, which may be formed and developed as described above, in which, in different switch positions of the switch plate, the same through-opening in the switch plate is used for connecting different input branches to the respectively assigned output branch. The same through-opening can thereby be used in different switch positions of the switch plate for respectively different connections between the respective different input branch and the associated output branch. A short switch plate, which requires little installation space, can thus realize many different switch positions. By the translational movement of the switch plate configured as an endless belt in the transverse direction within the gap, the switch plate can be guided past the input channels or output channels in a space-saving manner so that a space-saving distribution of fluids is enabled with the aid of the multi-valve.

Figure 2:
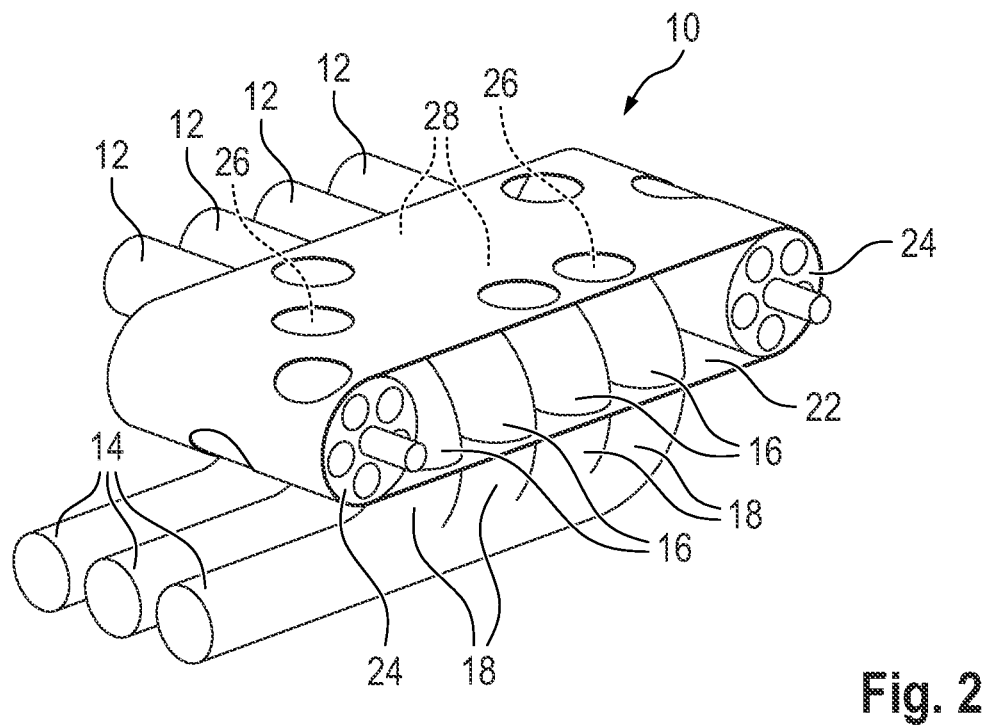
FIG. 2 shows a schematic perspective view of the multi-valve of FIG. 1.

The multi-valve 10 shown only in part in FIG. 1 may, for example, be used for a climate control device of a motor vehicle, with the aid of which a cabin climate in the interior of the motor vehicle that is influenced by an air-conditioning system can be temperature-controlled and/or a motor vehicle battery can be temperature-controlled by mixing different liquids at different temperatures for different consumers. In the illustrated exemplary embodiment, the multi-valve 10 is adapted to connect four input channels 12 to three output channels 14 according to a connection strategy defined in a plurality of switching states or to separate them from one another. However, the number of input channels 12 the number of output channels 14 may be chosen almost as desired, preferably the number is respectively less than ten, particularly preferably respectively less than six. However, it is also possible to provide more than ten input channels 12 and output channels 14. Moreover, in the illustrated exemplary embodiment, the flow directions of the input channels 12 extend substantially perpendicularly to the flow directions of the output channels 14. Input branches 16, the number of which corresponds to the number of output channels 14, branch off each input channel 12. Output branches 18, the number of which corresponds to the number of input channels 12, branch off each output channel 14 (FIG. 2). The input branches 16 and the output branches 18 are arranged in pairs and spaced apart via a gap 20 substantially coaxially with one another so that each input channel 12 can be connected to each output channel 14 via a respective assigned pair of input branch 16 and output branches 18. The input branch 16 and the output branches 18 are arranged equidistantly to one another in rows and columns in a grid-like manner. A switch plate 22 arranged between sealing mats 36 (FIG. 2) is provided in the gap 20 and can be translationally displaced transversely to the input branches 16 and output branches 18 within the gap 20. Depending on the relative position of the switch plate 22 in the gap corresponding to a specific predefined switch position, connections between input branches 16 and output branches 18 that follow one another in the flow direction can be opened or closed with the aid of the switch plate 22.

As shown in FIG. 2, the switch plate 22 is configured as an endless belt, which is deflected by, for example, two deflection rollers 24 and in the illustrated exemplary embodiment is guided around the input channels 12. The switch plate 22 configured as an endless belt is here positioned as closely as possible to the input channels 12. The input channels 12 extend out of an end face of a volume limited by the switch plate 22 configured as an endless belt. Alternatively, the switch plate 22 configured as an endless belt can be guided around the output channels 14 in an analogous manner rotated by 90°. At least one deflection roller 24 may be driven by an actuator, for example, a drive means configured as a stepper motor. The actuator can in particular be actuated by a control device to actuate a desired switch position of the switch plate 22.

The switch plate 22 has through-openings 26 which can open a connection between an input branch 16 and an associated output branch 18 when positioned accordingly in the gap 22. The shape of the through-opening 26 corresponds in particular to the flow cross-section of the input branch 16 and of the associated output branch 18. The switch plate also has continuous regions 28 which can close a connection between the input branch 16 and the associated output branch 18 when positioned accordingly in the gap 22. The switch plate 22 configured as an endless belt may be linearly moved through the gap in the translational direction by the at least one deflection roller 24 so that the through-openings 26 and the continuous regions 28 may be positioned between other input branches 16 and associated output branches 18 depending on the relative position of the switch plate 22. This allows a sub-region, comprising through-openings 26 and/or continuous regions 28, of the switch plate 22 to be used for different switch positions. In the illustrated exemplary embodiment, the switch plate 22 guided around the four input channels 12 in a space-saving compact construction can easily occupy fifteen different switch positions, wherein not every one of the possible switch positions is however generally desired and only a subset of the maximally possible switch positions is to be actively reached.

Figure 3:
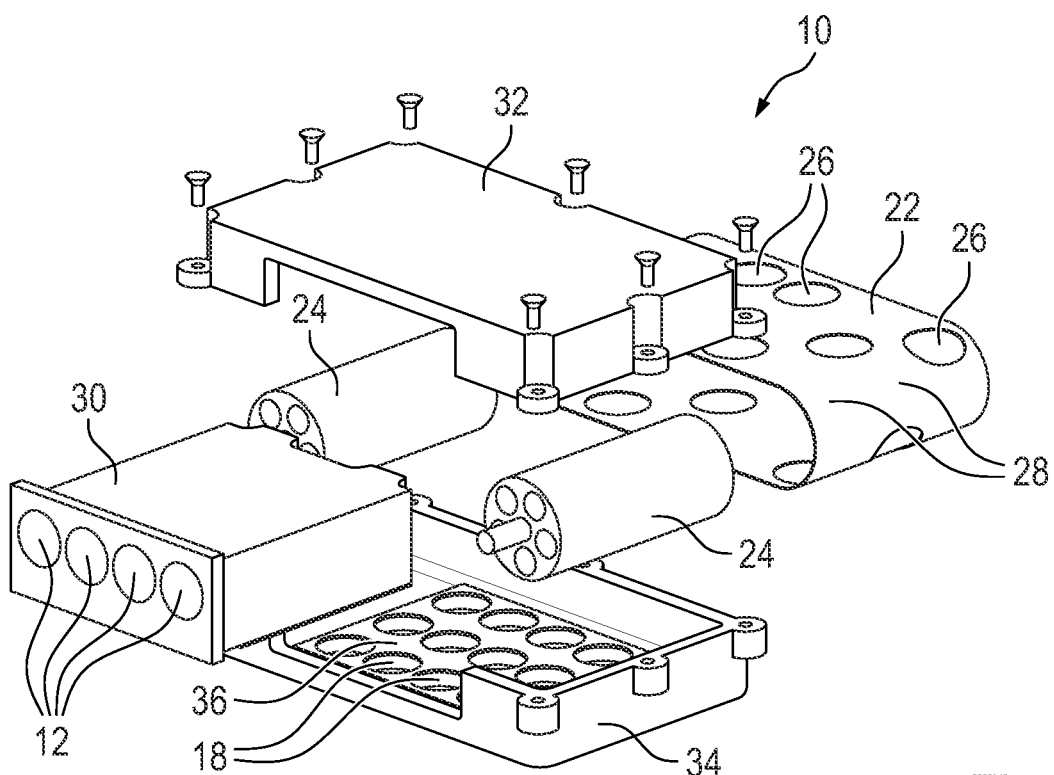
FIG. 3 shows a schematic exploded perspective view of the multi-valve of FIG. 2.

As shown in FIG. 3, the input channels 12 and the input branches 16 are formed by an input module 30 which is in particular produced by plastic injection molding and may be accommodated between an upper housing half 32 and a lower housing half 34. In the illustrated exemplary embodiment, the lower housing half 34 forms at least part of the output branches 18. The deflection rollers 24 may be rotatably accommodated by the upper housing half 32 and/or by lower housing half 34. The input module 30 is inserted at the end face between the deflection rollers 24 into the switch plate 22 configured as an endless belt. Preferably, the input module 30 is connected at one end face in the insertion direction to the upper housing half 32 and/or the lower housing half 34 and/or is supported and/or connected at the other end face on the upper housing half 32 and/or on the lower housing half 34 outside the volume limited by the switch plate 22. The switch plate 22 may be moved through the gap 20 between the input branches 16 of the input module 30 and the output branches 18 of the lower housing half 34 and may be sealed by sealing mats 36. In particular, the sealing mats 36 are significantly thicker than the switch plate 22.

Figure 4:
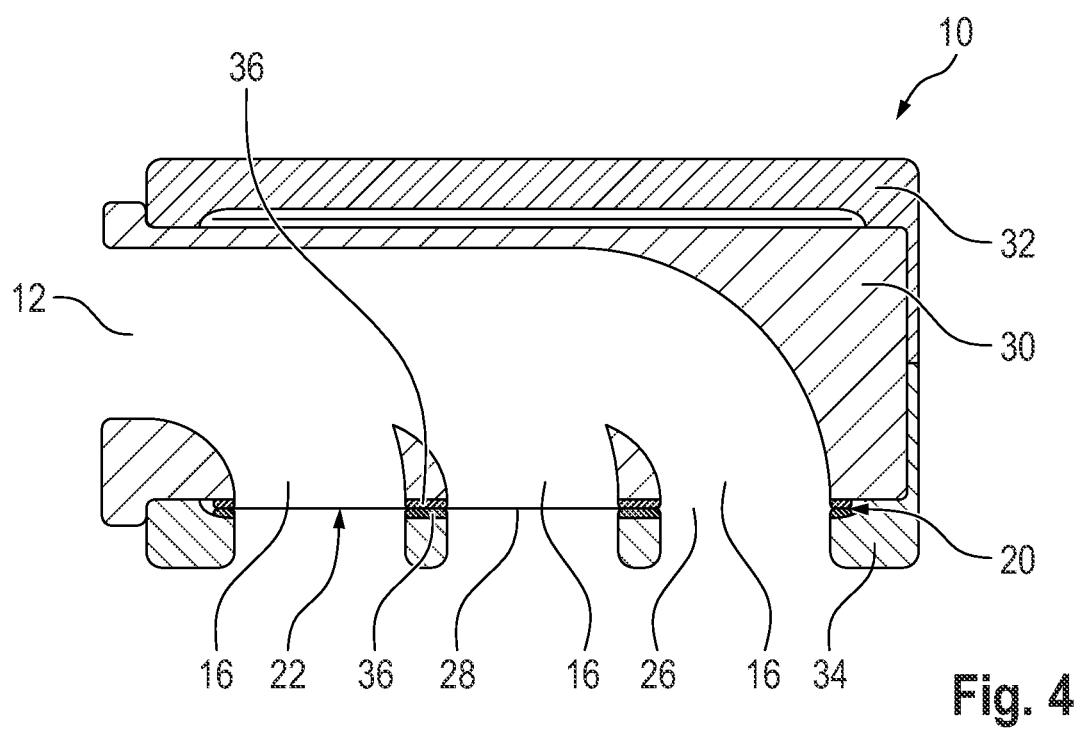
FIG. 4 shows a schematic longitudinal section of an upper half of the multi-valve of FIG. 2.

As shown in FIG. 4, with a specific considered input channel 12, in the switch position of the switch plate 22 shown, a connection can be established via a through-opening 26 to an assigned output channel 14 while the remaining connections are closed by the continuous regions 28 of the switch plate 22.

Figure 5:
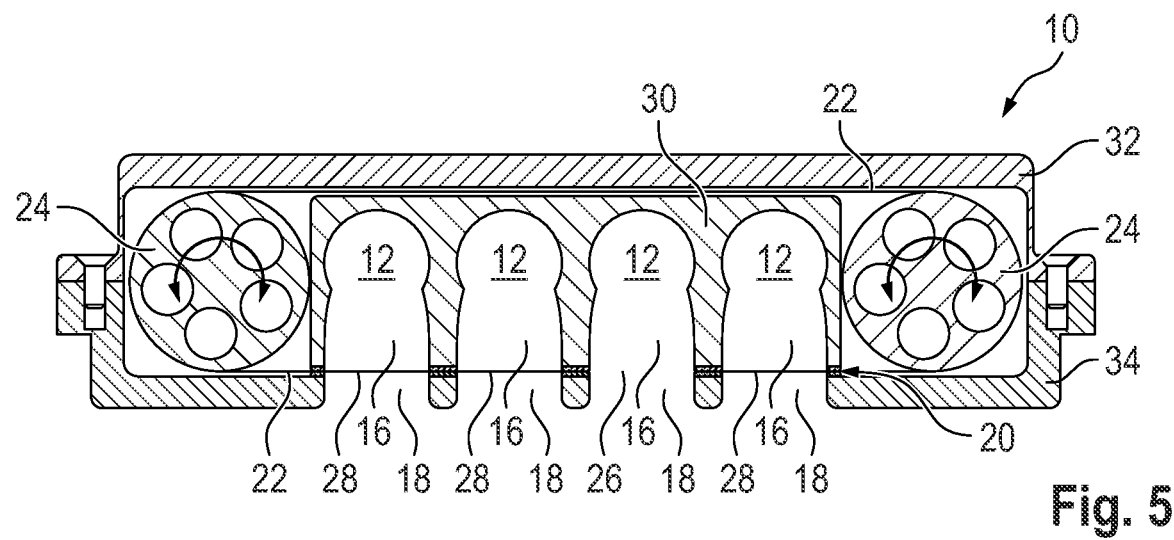
FIG. 5 shows a schematic cross-section of an upper half of the multi-valve of FIG. 2.

As shown in FIG. 5, in the illustrated switch position of the switch plate 22, a connection of the output channel 14 can be established via a through-opening 26 to an assigned input channel 12 while the remaining connections are closed by the continuous regions 28 of the switch plate 22.

In deviation from the switch positions shown in FIG. 4 and FIG. 5, it is also possible that in a differently translationally displaced switch position of the switch plate 22, an input channel 12 is connected to more than one output channel 14 or no output channel 14 at all and/or one output channel 14 is connected to more than one input channel 12 or no input channel 14 at all.

Figure 6:
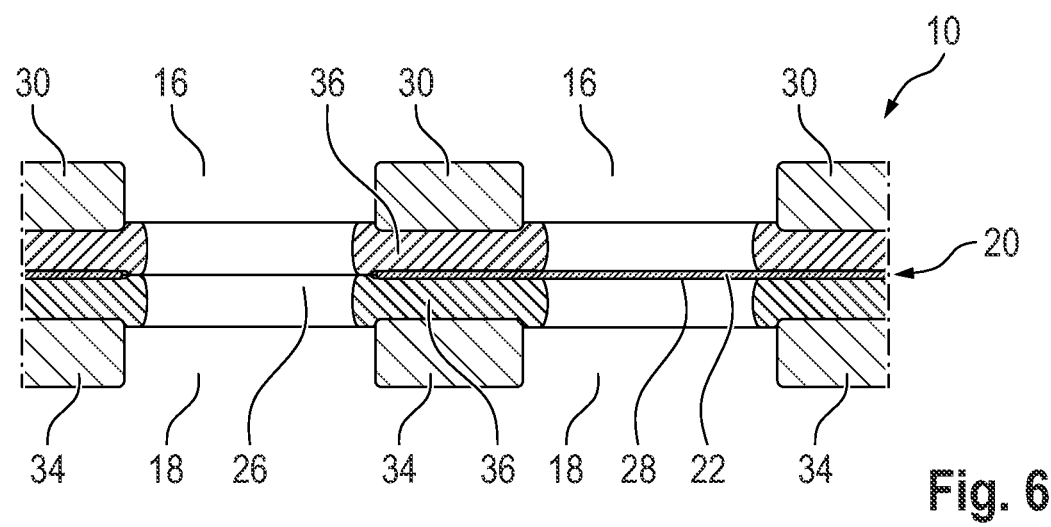
FIG. 6 shows a schematic detail view of the multi-valve of FIG. 5.

As shown in FIG. 6, the respective sealing mat 36 may be somewhat compressed by the switch plate 22 so that the sealing mats 36 may expand somewhat into the through-opening 26 of the switch plate 22. The two sealing mats 36 may contact one another at the inner edge of the through-opening 26 and may improve the sealing effect with respect to the switch plate 22 against the fluid conveyed through the through-opening 26.

Preferably, the switch plate 22 is as thin as possible so that an empty space at the edge of the through-opening 26 between the sealing mats 36 and the switch plate 22 is as small as possible and leakage can be minimized. The lower material thickness of the switch plate 22 results in a correspondingly lower dead volume at the edge of the through-opening 26 and/or at an outward facing narrow side of the switch plate 22 between the sealing mats 36 which come from an upper side and a lower side of the switch plate 22 and are guided in a sealing manner on one another within the through-opening 26 and/or outside of the switch plate 22. The merged sealing mats 36 need to bridge a smaller distance in the thickness direction of the switch plate 22 for their sealing contact and, as a result, can be merged at a smaller distance from the edge of the through-opening 26 or to the narrow side of the switch plate 22. The lower dead volume improves the leakage properties. Moreover, the dynamic deformation of the sealing mats 36 may be reduced with relative movement of the switch plate 22, thereby reducing the wear of the sealing mats 36. In addition, the effort required to switch the switch plate 22 can be reduced as a result.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A multi-valve for distributing at least one fluid, comprising:
   a plurality of input channels for supplying a respective fluid;
   a plurality of output channels for discharging the fluid, wherein a respective input channel can be connected via a plurality of input branches to a respective, substantially coaxially arranged output branch of a respective different output channel, wherein each respective input channel of the plurality of input channels is connected to each respective output channel of the plurality of output channels as a result; and
   a switch plate which is arranged in a gap between the input branches and output branches and can be translationally moved transversely to the input branches and output branches in order to open and/or close a connection of the respective input branch to the respectively assigned output branch,
   wherein the switch plate is connected to an endless belt.

2. The multi-valve according to claim 1, wherein the input branches and the output branches are regularly arranged in rows and columns at the gap.

3. The multi-valve according to claim 1, wherein the input channels or the output channels extend out of an end face of a volume limited by the switch plate, wherein all input branches or all output branches are provided within the volume.

4. The multi-valve according to claim 1, wherein the switch plate is guided in and/or out of the gap between the input branches and the output branches with the aid of at least one driven and/or moving deflection roller.

5. The multi-valve according to claim 4, wherein a diameter of the deflection roller corresponds to at least the sum of the extensions of the respective input channel and of the associated input branches or the sum of the extensions of the respective output channel and of the associated output branches along a flow direction in the gap between the input branches and the output branches.

6. The multi-valve according to claim 4, wherein the input channels and the output channels are aligned substantially perpendicularly to one another, wherein the deflection roller is arranged above or below the output channels and is positioned at a greater distance from the input channels than another deflection roller is or the deflection roller is arranged above or below the input channels and is positioned at a greater distance from the output channels than another deflection roller is.

7. The multi-valve according to claim 1, wherein the switch plate has through-openings for overflowing from the input branch into the output branch, wherein different connections of input branches to assigned output branches are opened and/or closed depending on the relative position of the switch plate.

8. The multi-valve according to claim 1, wherein a sealing mat for sealing the gap is provided between the switch plate and the input branches and/or between the switch plate and the output branches.

9. The multi-valve according to claim 1, wherein a control device for moving the switch plate to predefined switch positions is provided, wherein at least two switch positions utilize a same sub-region of the switch plate.

10. A method for operating a multi-valve according to claim 1, wherein in different switch positions of the switch plate, a same through-opening in the switch plate is used for connecting different input branches to the respectively assigned output branch.

11. The multi-valve according to claim 1, wherein the plurality of input channels comprise four input channels and the plurality of output channels comprise three output channels.

12. The multi-valve according to claim 1, wherein the plurality of input branches comprise three input branches and the plurality of output branches comprise four output channels.

13. A multi-valve for distributing at least one fluid, comprising:
   a plurality of input channels for supplying a respective fluid;
   a plurality of output channels for discharging the fluid, wherein a respective input channel can be connected via a plurality of input branches to a respective, substantially coaxially arranged output branch of a respective different output channel; and
   a switch plate which is arranged in a gap between the input branches and output branches and can be translationally moved transversely to the input branches and output branches in order to open and/or close a connection of the respective input branch to the respectively assigned output branch, wherein the switch plate is connected to an endless belt,
   wherein the switch plate is guided in and/or out of the gap between the input branches and the output branches with the aid of at least one driven and/or moving deflection roller, and
   wherein the input channels and the output channels are aligned substantially perpendicularly to one another, wherein the deflection roller is arranged above or below the output channels and is positioned at a greater distance from the input channels than another deflection roller is or the deflection roller is arranged above or below the input channels and is positioned at a greater distance from the output channels than another deflection roller is.

14. A multi-valve for distributing at least one fluid, comprising:

a plurality of input channels for supplying a respective fluid;

a plurality of output channels for discharging the fluid, wherein a respective input channel can be connected via a plurality of input branches to a respective, substantially coaxially arranged output branch of a respective different output channel; and a switch plate which is arranged in a gap between the input branches and output branches and can be translationally moved transversely to the input branches and output branches in order to open and/or close a connection of the respective input branch to the respectively assigned output branch, wherein the switch plate is guided in and/or out of the gap between the input branches and the output branches with the aid of at least one driven and/or moving deflection roller, and wherein a diameter of the deflection roller corresponds to at least the sum of extensions of the respective input channel and of the associated input branches or the sum of extensions of the respective output channel and of the associated output branches along a flow direction in the gap between the input branches and the output branches.

* * * * *